(12) United States Patent
Guillaume et al.

(10) Patent No.: US 9,699,652 B2
(45) Date of Patent: Jul. 4, 2017

(54) COMPARING GENERATED KEYS USING NON-SECURE CHANNELS

(71) Applicant: Robert Bosch GmbH, Stuttgart (DE)

(72) Inventors: Rene Guillaume, Weil Der Stadt (DE); Bikramjeet Buragohain, Kassel (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/748,277

(22) Filed: Jun. 24, 2015

(65) Prior Publication Data

US 2015/0381357 A1    Dec. 31, 2015

(30) Foreign Application Priority Data

Jun. 25, 2014 (DE) .................. 10 2014 212 224

(51) Int. Cl.
*H04L 9/08* (2006.01)
*H04W 12/04* (2009.01)

(52) U.S. Cl.
CPC .......... *H04W 12/04* (2013.01); *H04L 9/0875* (2013.01); *H04L 2209/80* (2013.01)

(58) Field of Classification Search
CPC ..... H04L 9/0875; H04L 9/0861; H04W 12/04
USPC ......................................................... 380/44
See application file for complete search history.

(56) References Cited

U.S. PATENT DOCUMENTS

| | | | | |
|---|---|---|---|---|
| 6,622,260 B1 * | 9/2003 | Marisetty | ............ | G06F 11/0724 714/10 |
| 6,978,343 B1 * | 12/2005 | Ichiriu | ................... | G11C 15/00 365/49.1 |
| 7,653,858 B2 * | 1/2010 | Nefedov | ........... | H03M 13/2757 714/755 |
| 7,942,324 B2 | 5/2011 | Chabanne | | |
| 8,713,400 B2 * | 4/2014 | Chen | ................. | H03M 13/2909 714/755 |
| 2006/0179401 A1 * | 8/2006 | Nefedov | ................ | H03M 13/29 714/800 |
| 2006/0242540 A1 * | 10/2006 | Cherian | .............. | G06F 11/1076 714/766 |
| 2008/0162791 A1 * | 7/2008 | Eldredge | ................. | G11C 11/56 711/103 |
| 2008/0197197 A1 * | 8/2008 | Simske | .............. | G06K 7/10722 235/462.09 |
| 2008/0235559 A1 * | 9/2008 | Yang | ................... | H03M 13/1111 714/758 |

(Continued)

*Primary Examiner* — Haresh N Patel
(74) *Attorney, Agent, or Firm* — Maginot, Moore & Beck LLP

(57) ABSTRACT

A first partner connected to a channel collects samples of a physical variable on the basis of a time-variable property of the channel; stores a first array of at least bivalent elements; stores a second array of at least bivalent elements, each element in the second array corresponding to a remaining element in the first array and representing a first state if the sample, to which the remaining element in the first array corresponds, is outside a limit range and representing a second state if the sample is within the limit range; receives a parity check bit from the second partner; subjects elements in the first array to a parity check using the parity check bit; and, if the parity check fails, determines a checked element in the first array whose corresponding element in the second array represents the second state, and inverts the determined element in the first array.

9 Claims, 2 Drawing Sheets

(56) References Cited

U.S. PATENT DOCUMENTS

| | | | |
|---|---|---|---|
| 2009/0073009 A1* | 3/2009 | Oda | H03M 13/2915 |
| | | | 341/94 |
| 2011/0066918 A1* | 3/2011 | Ramaraju | G06F 11/1012 |
| | | | 714/757 |
| 2012/0017136 A1* | 1/2012 | Ordentlich | G06F 11/1028 |
| | | | 714/763 |
| 2013/0141992 A1* | 6/2013 | Lee | G11C 7/18 |
| | | | 365/189.14 |
| 2013/0141997 A1* | 6/2013 | Lee | G11C 8/08 |
| | | | 365/203 |
| 2014/0095101 A1* | 4/2014 | Gizdarski | G01R 31/31833 |
| | | | 702/120 |

* cited by examiner

COMPARING GENERATED KEYS USING NON-SECURE CHANNELS

This application claims priority under 35 U.S.C. §119 to application no. DE 10 2014 212 224.4, filed on Jun. 25, 2014 in Germany, the disclosure of which is incorporated herein by reference in its entirety.

BACKGROUND

The disclosure relates to an apparatus set up to carry out such a method, to a corresponding computer program and to a machine-readable storage medium having such a program.

A symmetrical cryptosystem is a cryptosystem in which, in contrast to an asymmetrical cryptosystem, both subscribers use the same key. The use of the same key for encryption and decryption entails the key itself first of all having to be transmitted before any encrypted interchange. However, since the security of the entire method depends on keeping the key secret, conventional approaches usually provide for the key to be interchanged via a secure channel.

In contrast, the practice of interchanging the key via non-secure channels is still a challenge for a person skilled in the art. In this respect, the prior art provides approaches such as the known Diffie-Hellmann key interchange or so-called hybrid encryption methods which make it possible to interchange symmetrical keys by incorporating asymmetrical protocols.

However, in the recent past, cryptosystems which move the problem of key interchange from the application layer of the OSI reference model to its physical layer (PHY) have been increasingly discussed.

Such approaches are used, for instance, in the still new field of cyber-physical systems which are distinguished by a high degree of complexity and the primary use of wireless and therefore inherently non-secure communication channels. Corresponding methods provide for each of the parties involved to derive a key from the technical properties of the channel connecting them in such a manner that the keys generated in this way largely match without the need to transmit specific parts of the key.

These cryptosystems therefore have the common feature of the need to eradicate discrepancies between the keys generated on both sides using the non-secure channel without weakening the negotiated key in the event of electronic eavesdropping. In order to solve this problem, U.S. Pat. No. 7,942,324 B1, for instance, proposes the use of the CASCADE protocol known from quantum computing.

SUMMARY

One advantage of this solution is that the key is weakened only insignificantly during the comparison. In comparison with the use of a conventional method for comparing the key, a lower loss of entropy results for the resultant key since—in terms of statistics—it is more rarely necessary to transmit individual key bits via the non-secure communication channel. Rather, the first communication partner uses its knowledge of the physical properties of the communication channel to independently determine, if discrepancies occur, the likely differing key bit without further need for coordination.

Further advantageous refinements allow the method according to disclosure to be carried out with a second communication partner adapted to the conventional CASCADE protocol without extensive adaptations.

The embodiment, according to which, before the parity check bit is calculated, the second communication partner subjects the elements in the third array to a predefined permutation, and, before the parity check, the first communication partner subjects the elements in the first array and in the second array to the same permutation, supplements the described sequence with a preceding permutation which additionally makes it difficult for an attacker to reconstruct the key from the corrections negotiated between the legitimate communication partners.

The preferred variant, according to which the communication channel is wireless and the time-variable property is a transmission quality of the communication channel and the physical variable indicates a reception field strength, adapts the method in question to the frequent application of a wireless communication channel. In this case, the time-variant signal strength proves to be a parameter of the used channel which can be easily determined and at the same time has a high degree of dependence on the position and therefore proves to be a suitable physical starting point for the approach according to the disclosure.

The alternative, according to which the time-variable property is an electromagnetic oscillation and the physical variable is a phase shift, is instead based on the phase shift of the transmitted signal, which phase shift can be measured with high resolution and is largely uniformly distributed over relatively large distances.

BRIEF DESCRIPTION OF THE DRAWINGS

Exemplary embodiments of the disclosure are presented in the drawings and are explained in more detail in the the description below.

In the drawings.

DETAILED DESCRIPTION

Figure 1:
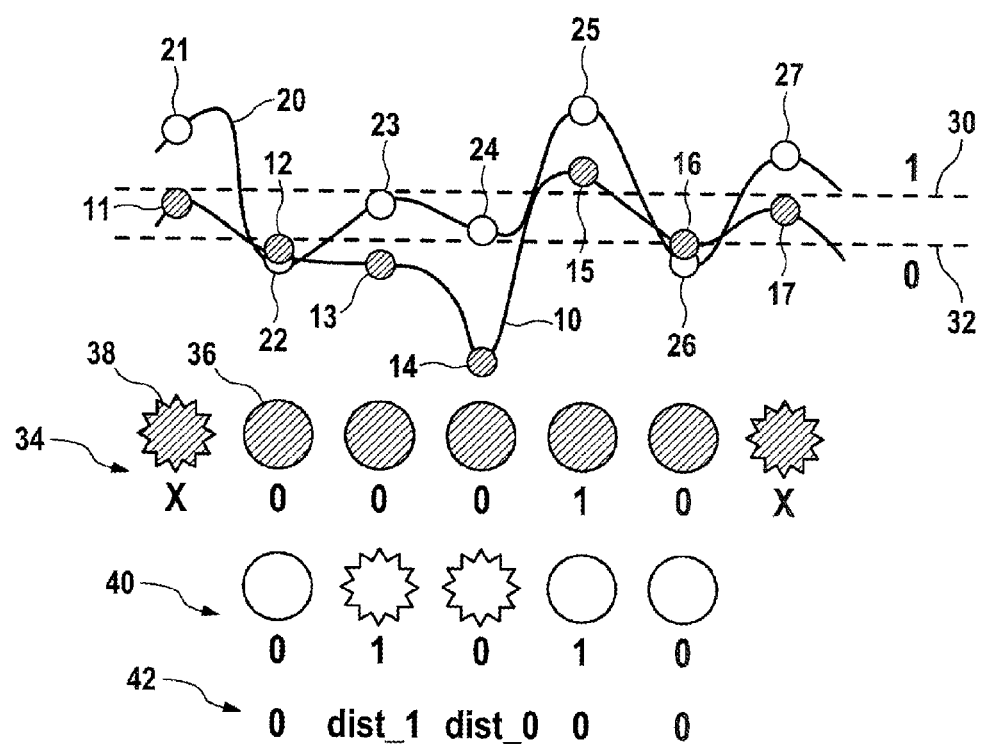
FIG. 1 shows a schematic sequence of a first phase of a method according to the disclosure.

The schematic illustration in FIG. 1 illustrates the sequence of a method according to the disclosure between two communication partners connected via a largely reciprocal communication channel. In the present application scenario, the aim of carrying out the method is for both communication partners to negotiate a common key in the form of a binary number. In this case, the physical peculiarities of the wireless communication channel connecting them are intended to be used to randomize the key in order to disclose only a minimum amount of information to possible attackers.

In the given case, the relative reception field strength 10, 20 (received signal strength indicator, RSSI) measured by both communication partners when transmitting a known sequence of seven values within a narrowly defined time window is used in this case as the physical measurement variable and therefore as the starting point of the method. It goes without saying that, in an alternative embodiment, the phase shift of the communication channel, as can be measured on both sides, may likewise be used as the measurement variable without departing from the scope of the disclosure.

The nature of wireless transmission entails the fact that the reception field strength 20 measured by the first communication partner differs from that reception field strength 10 determined by the second communication partner. In this respect, the phenomena of distortion and interference familiar to a person skilled in the art are taken into account, for instance, as are measurement errors caused by manufacturing tolerances of the underlying hardware.

In order to convert the respectively measured reception field strength 10, 20 into correlating binary values at discrete intervals of time, both communication partners sample the reception field strength 10, 20 at a predefined rate, the first communication partner obtaining the samples 21 to 27, whereas the second communication partner obtains the differing samples 11 to 17. Two limit values 30, 32 selected in a suitable manner are now used to quantize the samples 11-17, 21-27 from both sides, in which case different statistical methods for determining suitable limit values 30, 32 are known to a person skilled in the art.

In this case, each of the communication partners assigns a first state 0 to those samples which are below the lower limit value 32 and assigns a second state 1 to those samples which are above the upper limit value 30. In the present embodiment, the samples 11, 17, 23, 24 between the lower limit value 32 and the upper limit value 30 are first of all assigned to one of the two states—according to the closer limit value 30, 32—even though differing embodiments may use a different marking by means of further state values.

If the resulting state sequences are expressed as bit strings, the first communication partner determines the sequence "1010101" corresponding to the samples 21-27, whereas the second communication partner records the differing sequence "1000101" on the basis of the samples 11-17 illustrated in a hatched manner. In this case, the second communication partner identifies the first and last bits as questionable since the corresponding samples are in the limit range between the lower limit value 32 and the upper limit value 30. This circumstance—illustrated by hatched stars 38 according to the figure—causes the first communication partner to store only the relatively certain bits "00010"—indicated by hatched circles 36 according to the figure—which correspond to the samples 22-26. In contrast, the first and last bits in the array 34 which are identified as dubious are added to a selection—here symbolized by the marking "X"—of bit positions to be rejected. It goes without saying that this symbolic marking may be replaced with any means familiar to a person skilled in the art, for instance with a corresponding bit mask or a list of the relevant bit positions.

In order to also make the described selection of bits to be rejected available to the first communication partner, the second communication partner generates a corresponding selection message and transmits the latter to the first communication partner using the common communication channel. The information content of the selection message transmitted via the non-secure channel comprises in this case only the selected bit positions and not the entire array 34 in order to avoid disclosing any fragments of the key to be negotiated to possible attackers.

After receiving the selection message, the first communication partner in turn rejects the selected bits—corresponding to the samples 21, 27 in the present case—in its bit sequence "1010101", with the result that only the bit string "01010" represented as array 40 according to the figure remains. However, the first communication partner in turn 160 identifies the second and third bits in the remaining array 40 as marginal in this case since the corresponding samples 23, 24 are likewise in the range between the lower limit value 32 and the upper limit value 30. Although the first communication partner does not immediately reject these bits, it does take account of said circumstance by storing a second array 42 in order to locally mark the bit positions identified as unreliable. This symbolic marking is illustrated in FIG. 1 by the logical values "dist_0" and "dist_1", but various data structures may fulfill the same purpose again.

Figure 2:
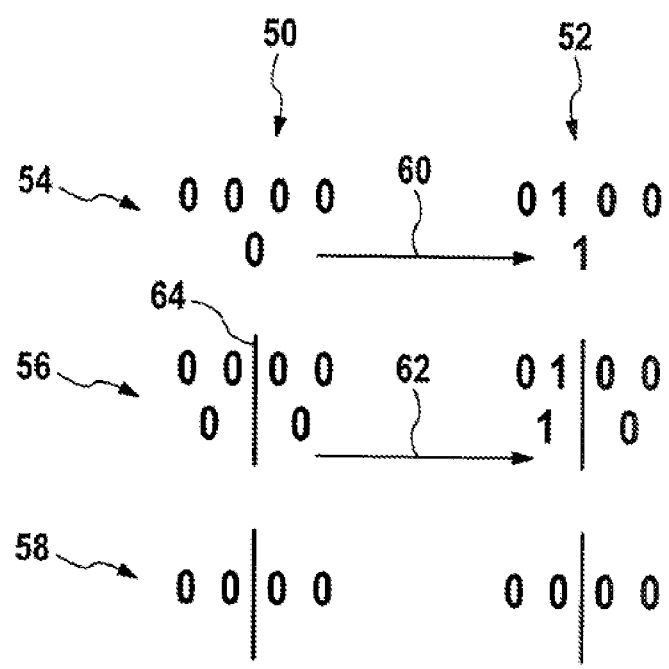
FIG. 2 shows a schematic sequence of a second phase of the method according to the disclosure.

FIG. 2 shows the subsequent key comparison between the first communication partner 52 and the second communication partner 50 in detail. This phase of the method corresponds, in terms of its principles, to the previously known CASCADE algorithm. In this case, the first communication partner 52 skillfully uses the information relating to the reliability of the individual bit positions which is available from the preceding quantization phase in the form of the second array 42 in FIG. 1. This inventive optimization of the key comparison allows the communication partners 50, 52 to dispense with interchanging individual key bits via the non-secure communication channel in a third pass 58 of the protocol comprising three passes 54, 56, 58 in the present case.

Even before the first pass of the protocol, the communication partners 50, 52 subject the bit fields stored on both sides to a randomly selected permutation which is, however, identical on both sides. Therefore, only the partial sequence "0000" corresponding to the second, third, fourth and sixth bits in the array 34 is then taken into account by the second communication partner 50 and the partial sequence "0100" corresponding to the corresponding bit positions in the array 40 is taken into account by the first communication partner 52.

In the first pass 54, the second communication partner 50 calculates the parity of said partial sequence "0000" and therefore determines the parity check bit "0" which is transmitted by the second communication partner to the first communication partner 52 via the non-secure communication channel using a further message 60. The first communication partner in turn subjects the partial sequence "0100" stored by it to a parity check on this basis, which parity check is therefore condemned to fail in this case on account of the differing result "1".

The failure of the parity check in the first pass 54 causes the communication partners 50, 52 to carry out a second pass 56 of the protocol. For this purpose, the second communication partner 50 now subdivides the sequence "0000" stored by it into two identical partial sequences "00" along the dividing line 64 illustrated in the drawing and again calculates the corresponding parity check bits "0" for both partial sequences, which parity check bits are transmitted by the second communication partner to the first communication partner 52 in the form of a further message 62. In contrast, the first communication partner 52 equally subdivides the sequence "0100" stored by it into the partial sequences "01" and "00" which are each subjected to a parity check by the first communication partner on the basis of the transmitted parity check bits. In this manner, the first communication partner 52 manages, as it were, to limit the discrepancy between the locally stored bit string "0100" and the corresponding bit string "0000" of the second communication partner 50 to the first two bits in both sequences upon conclusion of the second pass 56.

The third pass 58 of the key comparison according to the disclosure begins at this point, which third pass now differs from the use of the conventional CASCADE protocol. In this respect, the first communication partner 52 is now able to benefit from the information represented by the second array 42 in FIG. 1. This information suggests that, among the two bits in question, the second bit "1", rather than the first bit "0", causes the discrepancy between the bit strings of the communication partners 50, 52 since this bit position in the second array 42 had been marked as not very reliable anyway with the logical value "dist_1".

The first communication partner 52 uses this indication to invert said second bit "1" to "0" without further interchange with the second communication partner 50 and therefore to correct the discrepancy between the bit strings on both sides. The resulting bit string "0000" which is identical between the communication partners 50, 52 can be used as a secret key for the further interchange between the communication partners 50, 52 as part of a symmetrical cryptosystem.

What is claimed is:

1. A method for generating a secret key, the method comprising:
    collecting, using a processor, with a first communication partner connected to a communication channel, a plurality of samples of a physical variable on the basis of a time-variable property of the communication channel;
    storing, using the processor, with the first communication partner, a first array of at least bivalent elements, each element in the first array corresponding to at least one sample and representing a first state when the sample is closer to a lower limit value than an upper limit value and representing a second state when the sample is closer to the upper limit value than the lower limit value;
    storing, using the processor, with the first communication partner, a second array of at least bivalent elements, each element in the second array corresponding to a remaining element in the first array and representing the first state when the sample, to which the remaining element in the first array corresponds, is outside a limit range defined by the lower limit value and the upper limit value and representing the second state when the sample is within the limit range;
    receiving, using the processor, with the first communication partner, a parity check bit from a second communication partner connected to the communication channel;
    subjecting, using the processor, with the first communication partner, predetermined elements in the first array to a parity check using the parity check bit;
    when the parity check fails:
        determining, with the first communication partner, a checked element in the first array whose corresponding element in the second array represents the second state; and
        inverting, with the first communication partner, the checked element in the first array; and
    receiving, with the first communication partner, a selection message from the second communication partner, and rejecting, with the first communication partner, selected elements in the first array on the basis of the selection message.

2. The method according to claim 1, further comprising:
    collecting in turn, with the second communication partner, the number of samples of the physical variable on the basis of the time-variable property of the communication channel;
    storing in turn, with the second communication partner, a third array of at least bivalent elements, each element in the third array corresponding to a sample and representing the first state when the sample is closer to the lower limit value than the upper limit value and representing the second state when the sample is closer to the upper limit value than the lower limit value;
    making, with the second communication partner, a selection of elements in the third array, each element in the selection of elements corresponding to a sample which is within the limit range;
    rejecting, with the second communication partner, the elements in the third array that are included in the selection of elements; and
    transmitting, with the second communication partner, a selection message to the first communication partner, the selection message corresponding to the selection of elements.

3. The method according to claim 2, further comprising:
    calculating, with the second communication partner, the parity check bit for predetermined remaining elements in the third array, after the elements in the selection of elements have been rejected, and
    transmitting, with the second communication partner, the parity check bit to the first communication partner, after the selection message has been transmitted.

4. The method according to claim 3, further comprising:
    when the parity check fails, grouping, with the first communication partner and second communication partner, the checked elements in the first array and the elements in the third array, which are used as a basis for calculating the parity check bit, into subarrays which correspond to one another;
    recursively repeating, with the second communication partner, until the mutually corresponding subarrays of the first array and of the third array match, the steps of:
        calculating the parity check bit; and
        transmitting the parity check bit; and
    recursively repeating, with the first communication partner, until the mutually corresponding subarrays of the first array and of the third array match, the steps of:
        receiving the parity check bit;
        subjecting the predetermined elements in the first array to the parity check;
        determining the checked element; and
        inverting the checked element.

5. The method according to claim 3, further comprising:
    subjecting, with the second communication partner, elements in the third array to a predefined permutation, before calculating the parity check bit; and
    subjecting, with the first communication partner, elements in the first array and elements in the second array to the predefined permutation, before subjecting the predetermined elements in the first array to the parity check.

6. The method according to one of claim 1, wherein:
    the communication channel is wireless;
    the time-variable property is a transmission quality of the communication channel; and
    the physical variable indicates a reception field strength.

7. The method according to one of claim 1, wherein:
    the time-variable property is an electromagnetic oscillation; and
    the physical variable is a phase shift.

8. An apparatus for generating a secret key, the apparatus comprising:
    a processor;
    a first communication partner connected to a communication channel, the first communication partner being configured to:
        collect a plurality of samples of a physical variable on the basis of a time-variable property of the communication channel;
        store a first array of at least bivalent elements, each element in the first array corresponding to at least one sample and representing a first state when the sample is closer to a lower limit value than an upper limit value and representing a second state when the sample is closer to the upper limit value than the lower limit value;

store a second array of at least bivalent elements, each element in the second array corresponding to a remaining element in the first array and representing the first state when the sample, to which the remaining element in the first array corresponds, is outside a limit range defined by the lower limit value and the upper limit value and representing the second state when the sample is within the limit range;

receive a parity check bit from a second communication partner connected to the communication channel;

subject predetermined elements in the first array to a parity check using the parity check bit;

when the parity check fails:
  determine a checked element in the first array whose corresponding element in the second array represents the second state; and
  invert the checked element in the first array; and receiving, with the first communication partner, a selection message from the second communication partner, and rejecting, with the first communication partner, selected elements in the first array on the basis of the selection message.

9. A non-transitory storage medium that stores a computer program, wherein the computer program is configured to perform a method for generating a secret key, the method including:

collecting, using a processor, with a first communication partner connected to a communication channel, a plurality of samples of a physical variable on the basis of a time-variable property of the communication channel;

storing, using the processor, with the first communication partner, a first array of at least bivalent elements, each element in the first array corresponding to at least one sample and representing a first state when the sample is closer to a lower limit value than an upper limit value and representing a second state when the sample is closer to the upper limit value than the lower limit value;

storing, using the processor, with the first communication partner, a second array of at least bivalent elements, each element in the second array corresponding to a remaining element in the first array and representing the first state when the sample, to which the remaining element in the first array corresponds, is outside a limit range defined by the lower limit value and the upper limit value and representing the second state when the sample is within the limit range;

receiving, using the processor, with the first communication partner, a parity check bit from a second communication partner connected to the communication channel;

subjecting, using the processor, with the first communication partner, predetermined elements in the first array to a parity check using the parity check bit;

when the parity check fails:
  determining, with the first communication partner, a checked element in the first array whose corresponding element in the second array represents the second state; and
  inverting, with the first communication partner, the checked element in the first array; and
  receiving, with the first communication partner, a selection message from the second communication partner, and rejecting, with the first communication partner, selected elements in the first array on the basis of the selection message.

* * * * *

UNITED STATES PATENT AND TRADEMARK OFFICE
CERTIFICATE OF CORRECTION

PATENT NO.        : 9,699,652 B2
APPLICATION NO.   : 14/748277
DATED             : July 4, 2017
INVENTOR(S)       : Guillaume et al.

It is certified that error appears in the above-identified patent and that said Letters Patent is hereby corrected as shown below:

In Column 6, Line 48, Line 1 of Claim 6 should read:
6. The method according to claim 1, wherein:

In Column 6, Line 53, Line 1 of Claim 7 should read:
7. The method according to claim 1, wherein:

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*